(12) United States Patent
Hushon, Jr. et al.

(10) Patent No.: US 8,972,637 B1
(45) Date of Patent: Mar. 3, 2015

(54) GOVERNANCE OF STORAGE

(71) Applicant: EMC Corporation, Hopkinton, MA (US)

(72) Inventors: John D Hushon, Jr., Medfield, MA (US); Nihar K Nanda, Acton, MA (US); Jeffrey M Nick, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 104 days.

(21) Appl. No.: 13/729,701

(22) Filed: Dec. 28, 2012

(51) Int. Cl.
*G06F 3/00* (2006.01)
*G06F 13/12* (2006.01)
*G06F 3/06* (2006.01)

(52) U.S. Cl.
CPC .................................... *G06F 3/0607* (2013.01)
USPC ............................................... 710/74; 710/15

(58) Field of Classification Search
None
See application file for complete search history.

(56) References Cited

U.S. PATENT DOCUMENTS

| 6,285,966 | B1* | 9/2001 | Brown et al. | 702/188 |
| 2008/0120440 | A1* | 5/2008 | Balasubramanian et al. | 710/19 |

* cited by examiner

*Primary Examiner* — Idriss N Alrobaye
*Assistant Examiner* — David Martinez
(74) *Attorney, Agent, or Firm* — Krishnendu Gupta; Joseph D'Angelo

(57) ABSTRACT

A computer program product, system, and computer implemented method comprising intercepting, by an interceptor, IO send on an IO path to a storage array; sending a copy of the IO and metadata to a message bus, and enabling a consumer to register with the message bus to consume events sent to the message bus.

20 Claims, 15 Drawing Sheets

PUBLISH TO RAW EVENT STREAM

PUBLISH TO TOPIC STREAM

SUBSCRIBE FROM TOPIC STREAMS

SUBSCRIBE FROM TOPIC STREAMS

GOVERNANCE OF STORAGE

BACKGROUND

A traditional storage array (herein also referred to as a "disk storage array," "disk array," "data array," or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

SUMMARY

A computer program product, system, and computer implemented method comprising intercepting, by an interceptor, IO send on an IO path to a storage array; sending a copy of the IO and metadata to a message bus, and enabling a consumer to register with the message bus to consume events sent to the message bus.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
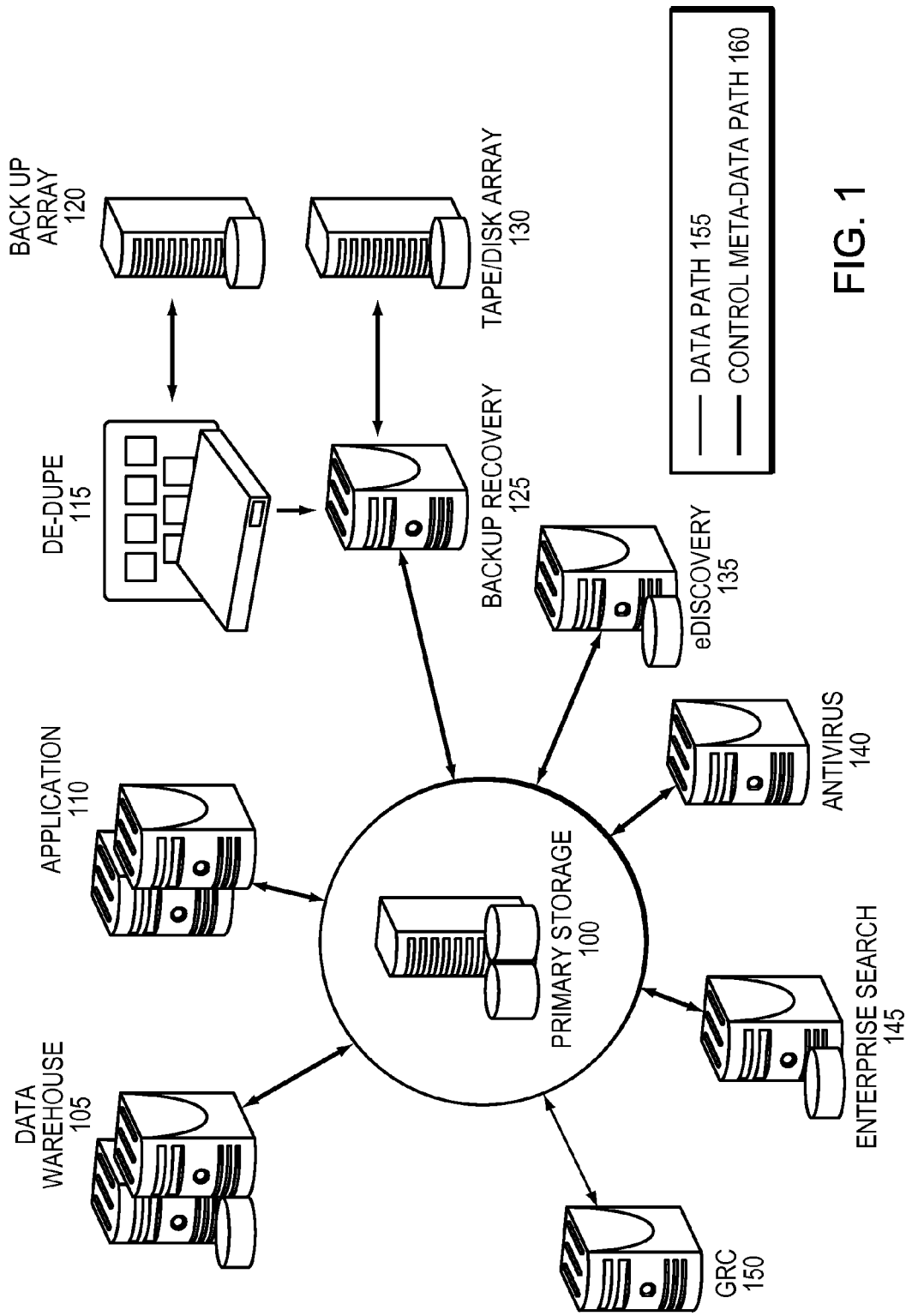
FIG. 1 is a simplified illustration showing interactions between applications, a classifier, and back-up devices with primary storage, in accordance with an embodiment of the present disclosure.

Typically, Storage Infrastructure is being asked to do more with respect to functional and non-functional requirements. Conventional requirements may include DeDupe, Access Control, Virus Scanning, Litigation Hold, Enterprise Search, BC/DR through consistent replication, Versioning, Staging/Locational Positioning, JIT Provisioning, Integrity Management, and Fault Tolerance. Generally, the amount of information stored is also increasing at an astounding rate. Conventionally, storage awareness and context management may also be required.

In some embodiments, the current disclosure may enable use of an out-of-band channel to monitor and distribute change content and data access requests, based upon subscription policies, I/O activity or activity summaries. In certain embodiments, the current disclosure may enable persisting of events external to a sideband storage system (governance system). In most embodiments the current disclosure may enable a governance registry/repository to provide a coherent link to original information while providing a sideband copy to enable de-duplication, classification, audit and other governance functions to minimize their impact on a primary storage I/O path. In alternative embodiments, data stores may be fully materialized copies of the data, or sparse representations with a focus on critical information such as classifications, search criteria/keywords, or even management event activity. In further embodiment the current disclosure may enable an independence of access to governance information so as to minimize any administrative disruption to the primary storage path whether file, object or block. In still further embodiments, external stores may act as snapshots, versioning systems, indexes, logs and other capabilities as necessary to fulfill an information governance requirement that would have otherwise required multiple accesses to the primary data volume.

In certain embodiments, a primary storage system may be embedded with an agent or module for emitting metadata. In some embodiments, an agent or module may enable notifications on content change or access notifications. In most embodiments, an out-of-band channel or link may communicate with an event coordinator. In further embodiments any number of external storage systems may be attached to the agent or module. In at least some embodiments, there may be event agents attached to the governance systems. In many embodiments, a physical network may enable communication.

In certain embodiments, event management may be enabled via a message bus implementing a continuous event stream of control algorithm in an out-of-band event coordinator. In some embodiments, storage events may be normalized and categorized prior to distribution to registered external storage agents such as snapshots, versioning systems, indexes, logs, governance systems. In at least one embodiment, a secondary event queue may be used for temporary offline participants. In further embodiments, the events may be composed of multi-part messages for variable number of participants, and dynamic membership, and participant re-entry. In most embodiments, the current disclosure may enable reconstruction of the related events available to the subscribing storage services. As used herein, IGS may stand for Information Governance System and CEP may stand for Continuous Event Process.

In certain embodiments, the current disclosure may enable a shorter latency in the typical WORM (Write Once Read Many times) scenario by eliminating unnecessary I/O loops between primary storage and IGS, as well as among the external storage systems. In some embodiments, every content change may be audited by a raw event and emitted through a sideband embedded agent. In most embodiments, each participating IGS may endorse the content by appending their own signature. In further embodiments, a veto maybe carried along the event to prevent content persistency. In at least one embodiment, when event is finalized and no veto is found, the event may be called an end.

In an embodiment, primary storage event streams may be exposed to a CEP engine to classify and may determine the admissibility of the event to a message board. In some embodiments, topics may be set be registered participates who subscribe to a stream. In most embodiments, registered participants may consume the stream at a predetermined latency. In certain embodiments, the stream may be consumed at an on-line time frame to a batch time frame. In some embodiments, this may minimize the latency in event itinerary and may prevent knowledge inconsistency in traditional asynchronous message dispatching.

In some embodiments, event management may leverage Restful web services over a messaging bus platform plus a Spring (an implementation of Java programming framework) styled dependency binding. In at least one embodiment, the end points may be injected as needed to contribute to the scalability of the entire model. In some embodiments, the event detection with message classification may scale with a Spring implementation as a solution for new events or topics introduced by storage platforms and the need for the new consumes. In other embodiments, the event management may capture and filter messages that are interesting for the collaborators participating on this framework.

In some embodiments, the current disclosure may enable processing and event distribution in an asynchronous environment with multiple participants. In certain embodiments, the current disclosure may enable a multi-part messaging strategy containing references to processing directives, links to the original and processed content (fidelity materialized on demand) and identity of the operating processor. In most embodiments, participants to the information stream may publish and subscribe to messages to a topic hosted in the messaging service bus. In at least some embodiments, participants listening may read information on the message bus, process and publish advices back to the message by adding additional information.

In at least one embodiment, a trailer may be added to a message with a signature. In certain embodiments, actions may be tracked by the auditing process and the message may re-enter the active queue. In certain embodiments, participant listening may see the information added to the message decide whether to consume the new information. In further embodiments, a message may be consumed, processed, and republished by multiple participants. In alternative embodiments, if processing on a message is completed, it may be marked as finalized and archived. In most embodiments, the messages may be distributed to different topics based on the configuration or participants of the quorum. In certain embodiments, a participant may sleep or be dormant and awake to pick up messages either from the main topic or a dedicated topic's archive queues for processing.

In some embodiments, there may be three queues. In at least one embodiment, there may be a Front-end queue. In most embodiments, the front end queue may be populated only by a primary storage system. In certain embodiments, the front end queue may be persistent with at least one guaranteed delivery point. In further embodiments, the correlation engine may be a consumer that is allowed to pick events from this queue. In still further embodiments, once the event is picked up from the topic, it may be flagged for removal. In certain embodiments, there may be an active queue. In most embodiments, the active queue may have messages posted by the primary storage system with the help of the correlation engine. In an embodiment, each message in the active queue may carry change pointers to the storage system and related the modification messages. In further embodiments, the active queue may be subscribed by multiple tenants accessing the messages from the queue, modifying the contents and then post back to the queue. In at least one embodiment, messages in the active queue may be kept for the specified round, then moved to archive queue. In some embodiments, messages in the archive queue may be posted by the active queue for non-present consumers. In at least one embodiment, archived messages in the archive queue may be kept for specified time and removed.

In certain embodiments, messages may be presented to the consumers using a multipart XML message structure. In some embodiments, a multipart XML message may have three major sections, Header, Body and the Trailer. In at least some embodiments, the message header may have a unique key with the originator and the message generation timestamps. In most embodiments, the header information may not be altered by a participant once the message is created. In further embodiments, the Body of the message may contain information posted by each participant following an action. In other embodiments, the message parts may be encapsulated in the body structure. In at least one embodiment, the message parts may be numbered sequentially as pieces are added. In certain embodiments, each of the message parts may have a header and a body. In an embodiment, the message part headers may have messageID, originator and timestamp corresponding to when the message was created. In other embodiments, the message body may contain information needed by the other participants. In some embodiment, the trailer section may capture audit trail information. In further embodiments, when a part is added to the message, the trailer section may get updated with a signature from the participant. In further embodiments, this may enable an audit trail, which may record which actions have been requested and taken. In still further embodiments, participants may not be available all the time. In these embodiments, the ability to subscribe and publish to message queues may enable intermittent access to the information.

In a particular embodiment, a storage system may generate events as actions are happening within the primary storage pipeline. In some embodiments, the events may be emitted through a licensed channel via JAX-RPC or MS-RPC to local or remote server. In certain embodiments, the events may be received and entered into front-end cache. In most embodiments, a consolidation service at the front-end cache may do an I/O classification and correlation to make events understandable for the participating systems. In at least one embodiment, a high speed CEP (complex event Processor) like ESPer, may correlate the events normalizing to a canonical format. In at least some embodiments, as messages are posted they may be consume the message and may be dispatched to IGS for actions. In an embodiment, the normalized events may be posted to an active topic with a queue shared by a registered quorum of external processors interested in various parts of Information Life-Cycle Management. In an alternative embodiment, a complex event stream processing system may be attached to a queue. In certain embodiments, for user actions like creation, modification of the file, content change metadata may be made available along with the content, to avoid an additional trip for the IGS systems to fetch the information from the primary storage. In alternative embodiments, file change content may be kept in the cache of primary storage, so read in the file content won't compromise the primary storage performance. In still further embodiments, basic metadata may be wrapped in an event.

In some embodiments, content metadata in messages may be dispatched to IGS systems registered for certain actions. In certain embodiments, an IGS adapter may read the content change information. In an embodiment, an IGS adapter may digest the information and may feed the information into the underlying IGS system. In some embodiments, an IGS participating system may take actions after it examines the information related in messages, like retention violation, sensitive data leak, or content re-index. In a particular embodiment, this may be done without adding any addition resource constraint to the primary storage. In an embodiment, the De-Dupe operation may get an alert from message that a file content has been changed or deleted, and compute the finger print of content, to determines if it is necessary to de-dupe or remove the file. In at least one embodiment, with the changed content and metadata, IGS may perform the corresponding operation and may publish the operation result, and may append it as a new message part to the original message. In certain embodiments, the message may re-enter the queue in a First In First Out (FIFO) way for continuous process. In some embodiments, if previous participant finds the message, then it may recognize its own footprint in the message part, and may leave the message in the queue untouched.

In certain embodiment, if a message reaches the end of the queue and still untouched, the message life count may minus one. In some embodiments, if the part count is zero then the message may be moved from the active queue to the archive queue. In other embodiments, the message may re-enter the queue in a FIFO way. In most embodiments, the initial life count of a message may depend on the IGS process speed and queue capacity. In at least one embodiment, when an IGS system joins as a participant, or an offline IGS system comes back online, it may examine the archive queue and may pick up any interested messages. In most embodiments, it may process the interested message and may publish the message back into active queue. In further embodiments, messages in the archive queue may be kept for a certain time (for example 60 min), and then may removed.

Refer now to the example embodiment of FIG. 1. Primary storage 100 is being accessed by data warehouse 105, applications 110, backup recovery 125, eDiscovery 135, antivirus 140, enterprise search 145, and grc 150. Dedup 115 works off back-up recover 125 and back-up array 120 works off dedup 115. Tape/disk array 130 works off back-up recovery 125. In this embodiment, each system accesses primary storage 100 directly for data, which may lead to an increased workload for primary storage 100.

Figure 2:
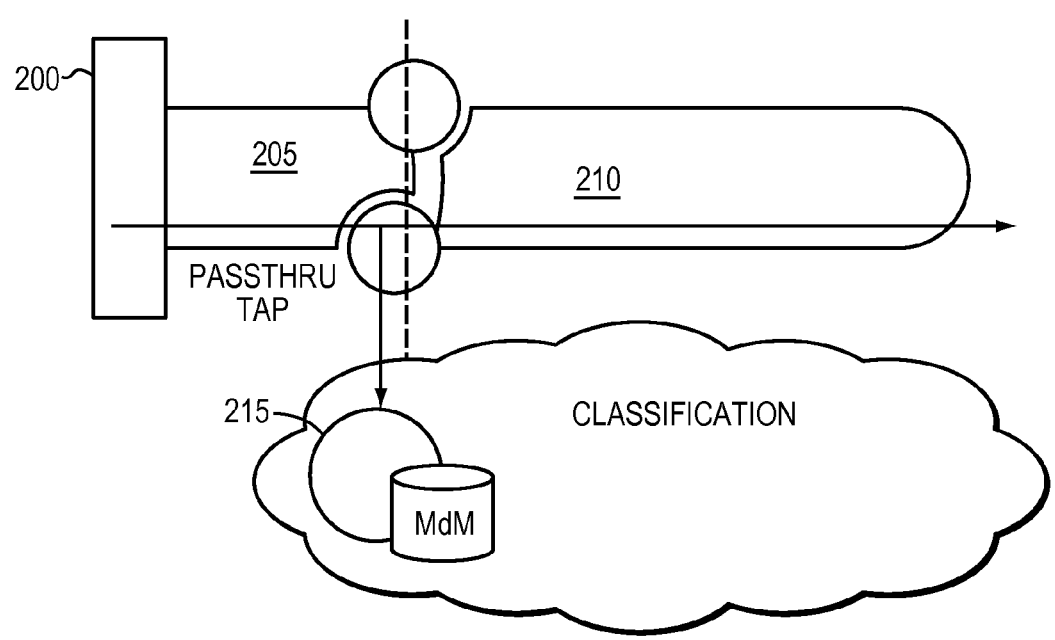
FIG. 2 is a simplified illustration of a device performing a tap on logging function in response to receiving a write or a read command, in accordance with an embodiment of the present disclosure.

Refer now to the example embodiment of FIG. 2, which represents and IO path. IO path 200 is made up of section 205 and section 210. IO Path 200 may also be referred to as a data or information stream. Metadata associated with the IO Stream or Data stream 200 may be routed across multiple participants or sections such as a Kernel, Module, driver, network, gateway, and or persistence provider. In this embodiment, the meeting point of each section, such as meeting point 215, may provide a way to interface with data flowing across data stream 200. At meeting point 215, it may be possible to intercept the data. In certain embodiments, the interface may be referred to as a tap.

Figure 3:
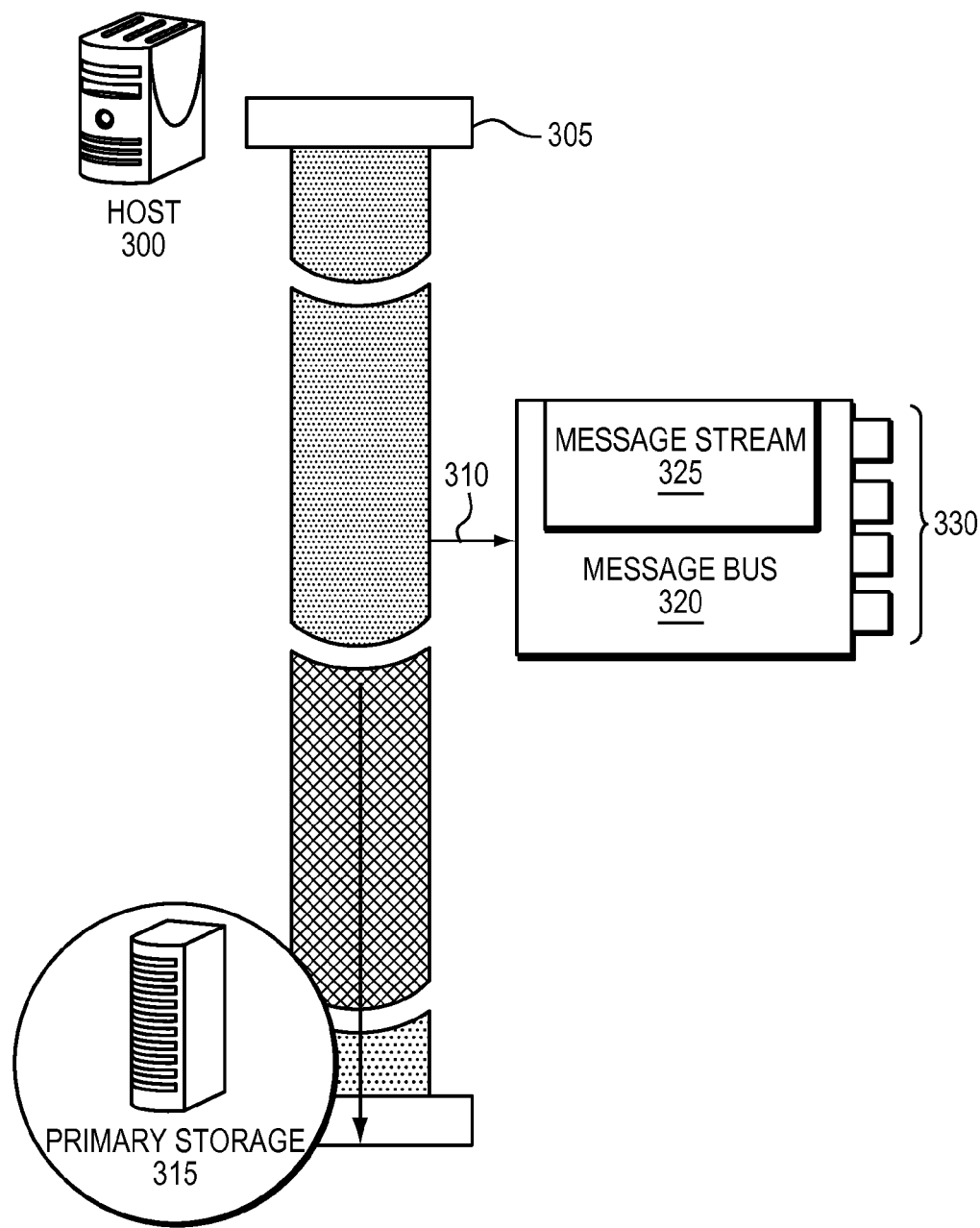
FIG. 3 is a simplified illustration of a tap in an IO steam with a message bus, in accordance with an embodiment of the present disclosure.
Figure 4:
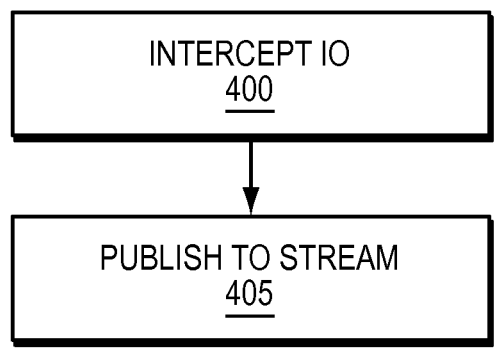
FIG. 4 is a simplified example of a method for intercepting an IO and publishing it to a stream, in accordance with an embodiment of the present disclosure.

Refer now to the example embodiments of FIGS. 3 and 4, which represent an example embodiment of intercepting data from a data path and an interception point. Data path 305 transports data from host 300 to primary storage 315, via point 310. In this embodiment, data across data path 305 is intercepted at point 310 (step 400). A copy of the data is sent to message bus 320 to message stream 325 (Step 405).

Figure 5:
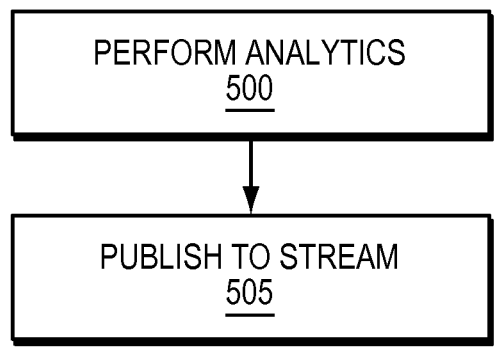
FIG. 5 is a simplified example of a method for performing analytics and publishing the analytics to a stream, in accordance with an embodiment of the present disclosure.

Refer now to the example embodiments of FIGS. 3 and 5, which represent an example embodiment of performing analysis on data in a stream and publishing data back to the stream based on the analysis. Box 330 performs analysis on the data in message stream 325 (step 500). Message bus 320 publishes the data to the event stream (Step 505). Message bus 320 also provides subscribing and publishing interfaces 330. In certain embodiments, message bus 320 may be a software box or module. In other embodiments, message bus 320 may be a hardware box.

Figure 6:
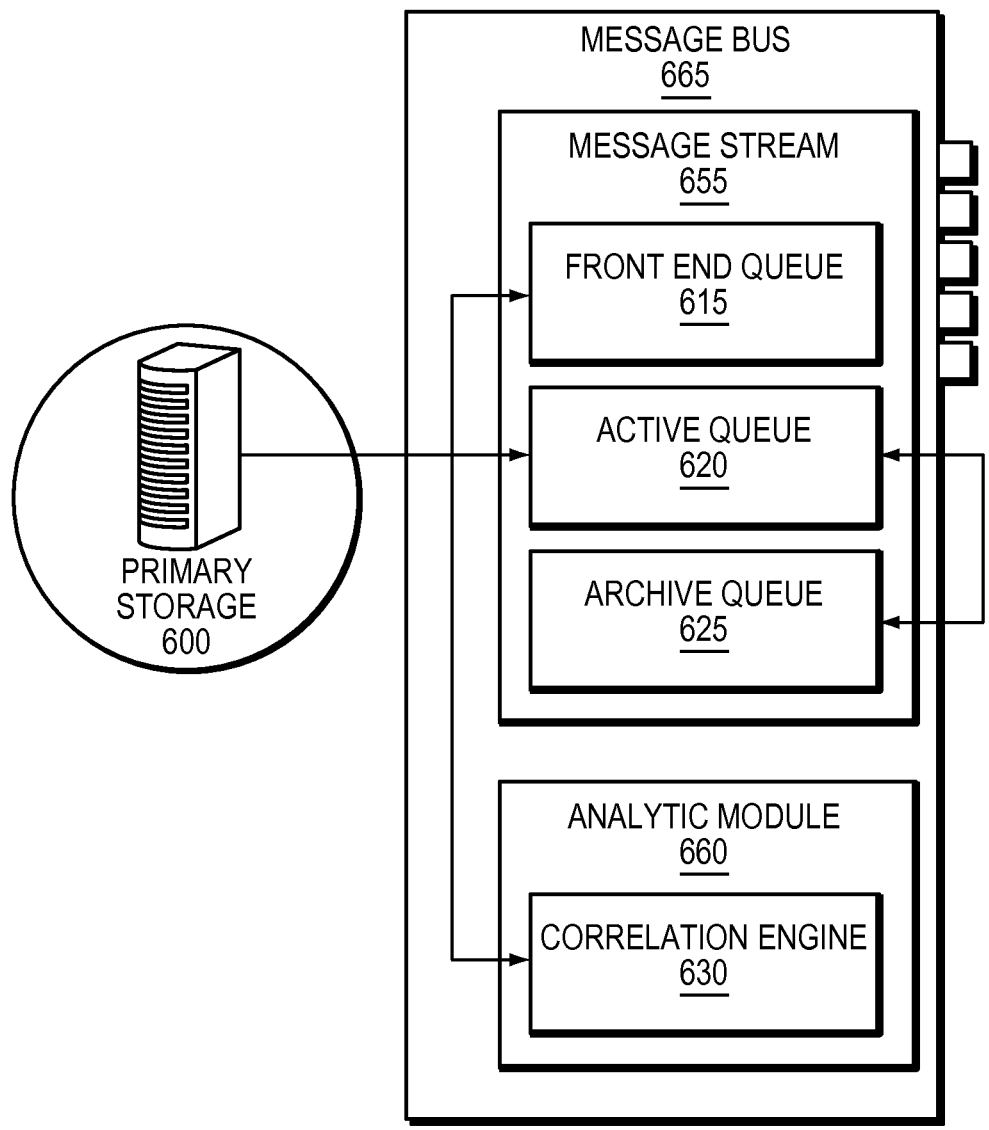
FIG. 6 is a simplified illustration of a message bus with three streams, in accordance with an embodiment of the present disclosure.

Refer now to the example embodiment of FIG. 6, which illustrates an exemplary embodiment of a message bus with 3 queues. Message bus 665, has a message stream 655 and an analytic module 660. Analytic module 660 has correlation engine 630. Message stream 655 has a front end queue 615, an active queue 620 and an archive queue 625. Front end queue 615 may interface with correlation engine 630. Correlation engine 630 may take events from and add events to the front end queue. Active queue 620 is a message queue in which primary storage 600 may insert messages. Active queue 620 may also put messages into archive queue 625.

Figure 7:
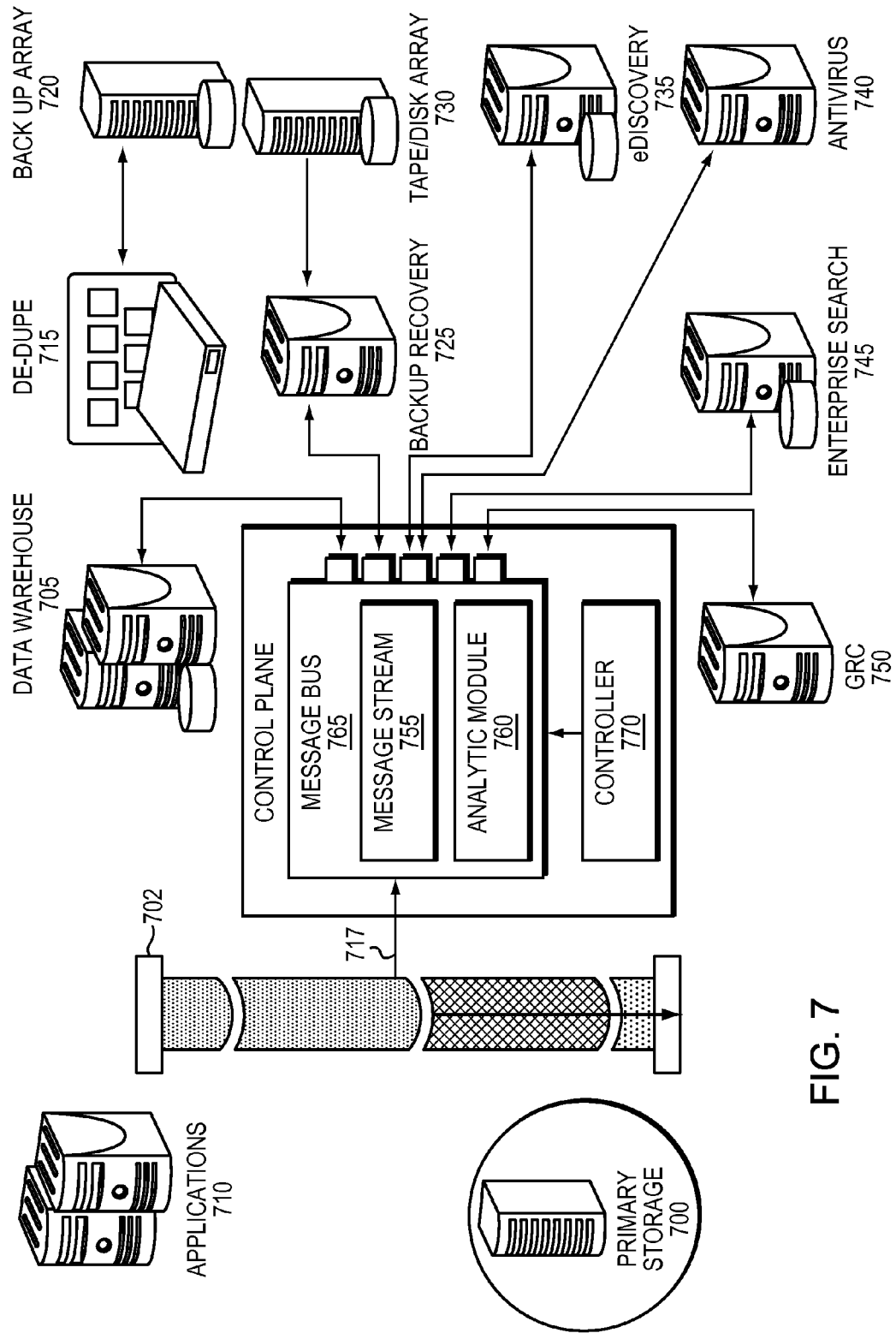
FIG. 7 is a simplified illustration of a message bus interacting with back-up, classification, and other entities subscribed to data written to a storage system, in accordance with an embodiment of the present disclosure.
Figure 8:
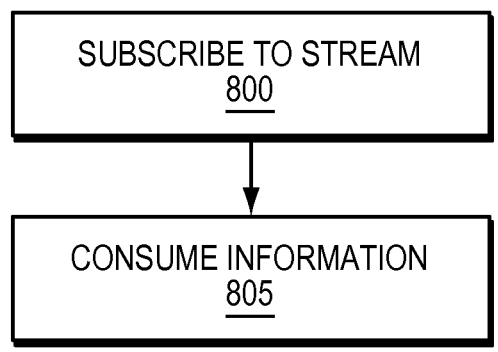
FIG. 8 is a simplified example of a method for subscribing to a message stream of a message bus, in accordance with an embodiment of the present disclosure.
Figure 9:
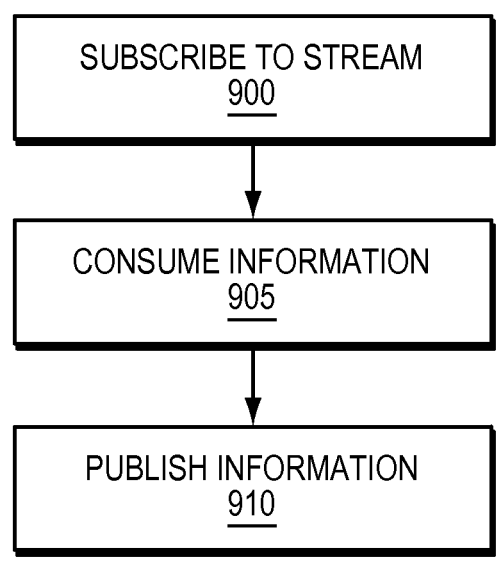
FIG. 9 is a simplified example of a method for subscribing to and publishing to a message bus, in accordance with an embodiment of the present disclosure.

Refer now to the example embodiment of FIG. 7, which represents and alternative arrangement of FIG. 1 leveraging a message bus. Refer now as well to the example embodiments of FIGS. 8 and 9, which in conjunction with FIG. 7 illustrate an exemplary embodiment of subscription and publication to the information of message bus 765. Data stream 702 transports data between host applications 710 to storage 700. At interception point 717 metadata and data may be tapped and sent to message bus 765 and is used to populate message stream 755. Data warehouse 705, backup recovery 725, eDiscovery 735, antivirus 740, enterprise search 745, and GRC 750 subscribe to (step 800) and consume information from stream 755 via message bus 763 (step 805). Some applications, such as antivirus 740 subscribe to data stream 755 (step 905), consume data from data stream 755 (step 810), and may publish data to data stream 755 (Step 915). In certain embodiments, information that may be published to a stream is that the data has been checked for viruses. In these embodiments, the virus checked information may then be consumed by a GRC application.

In certain embodiments, message stream 755 may consist of one or more queues or data streams, such as is illustrated in FIG. 6. In the embodiment of FIG. 7, analytic module 760 may perform analysis on data in the message stream and may re-publish the data for consumption by other subscriber. In at least some embodiments, certain subscribers, such as backup/recovery may only periodically, such as within a recovery window, read the information to which it is subscribed.

Figure 10:
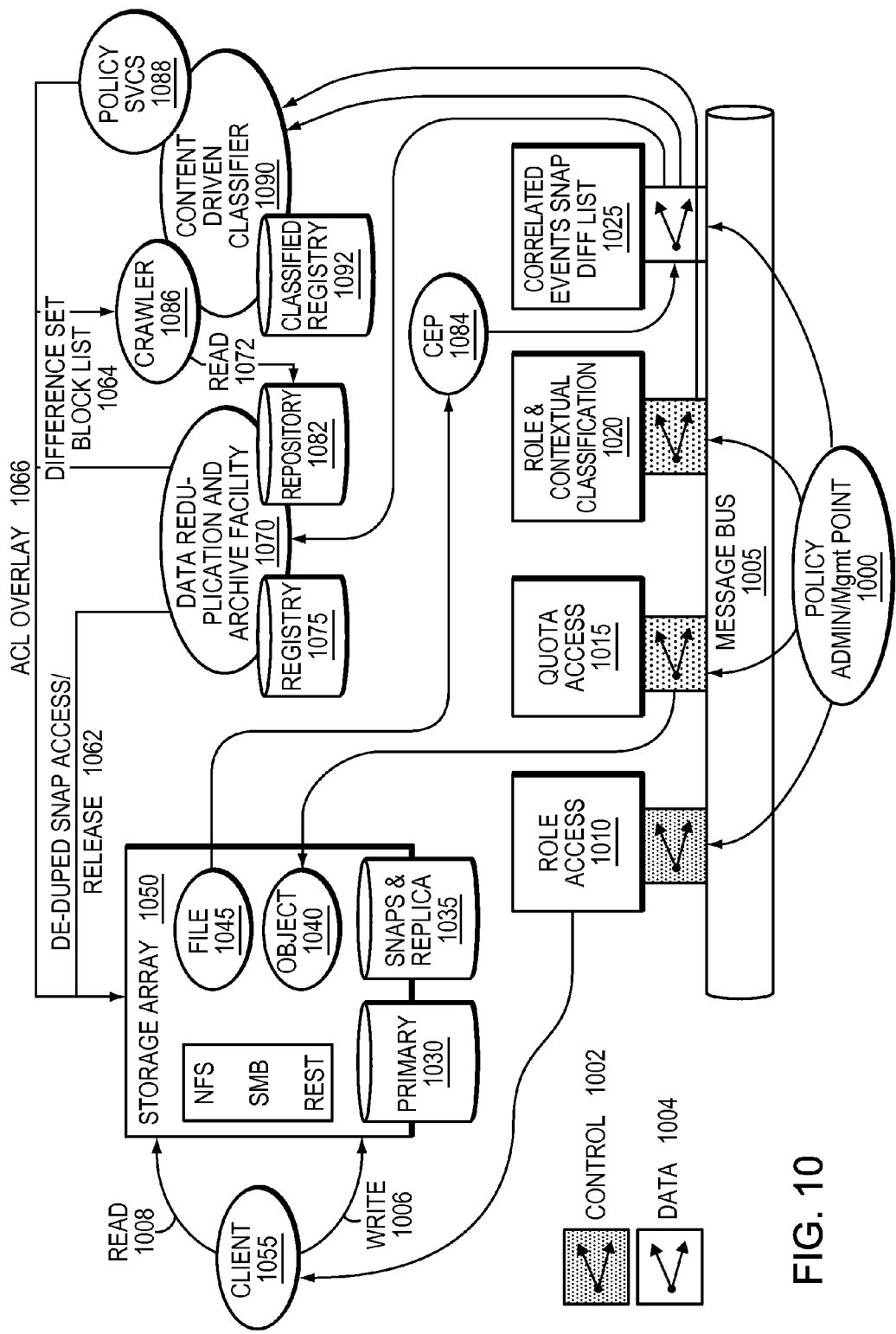
FIG. 10 is an alternative simplified illustration of a message bus interacting with back-up, classification, and other entities subscribed to data written to a storage system, in accordance with an embodiment of the present disclosure.

Refer now to the example embodiment of FIG. 10, which illustrates a simplified example of an entities consuming and publishing information. Message bus 1005 is controlled and administrated by policy administration management point 1000. Role access 1010 may provide Client 1055 with role policy information. Client 1055 interfaces with Storage Array 1050, thru NFS, SMB, and Rest industry standard protocols interfaces with read 1008 and write 1006 data from the client 1055. Storage array 1050 has primary storage 1030, and snap shots and replicas 1035. The File 1045 represents an information tap capturing the file operation metadata. The Object 1040 provides embodiments for policy object enforcements. In this embodiment the Object 1040 is provided by with data from Quota Access 1015 of Message Bus 1005. File 1045 feeds events to the Complex event processing (CEP) 1084 for analytics and correlations. The results are published to the Correlated Events Snap Diff List 1025 queue.

Correlated Events Snap diff list 1025 provides data to Data Reduplication and Archive Facility 1070 and Content Driven Classifier 1090. Content Driven Classifier 1090 has classified registry 1092 and interfaces with Crawler 1086 and Policy Services 1088.

Policy Services provides data Storage Array 1050 an overlay of ACL control. Data Reduplication and Archive Facility 1070 has Registry 1075 and Repository 1082. The Crawler 1098 reads the de-duped archived changed content from the Repository 1082 for classification. Upon a file content change event received from Correlated Events Snap Diff List 1025 the Data Reduplication and Archive Facility reaches out to the Storage Array 1050 thru the De-duped Snap access/released 1062 to archive the content. 1070 provides a difference set block list 1062 to Crawler 1086 for classification leaving the Storage Array 1050 out.

The Policy Admin/Mgmt Point 1000 provides administrative control point for event flow and governance of the attached quorum. The policies are published in the Role and Contextual Classification 1020 queue for the participants to follow the protocols for the quorum. When a new participant registers or joins after a gap, it refers to the policies published in the Role and Contextual Classification 1020 to configure its internals for participation.

Figure 11:
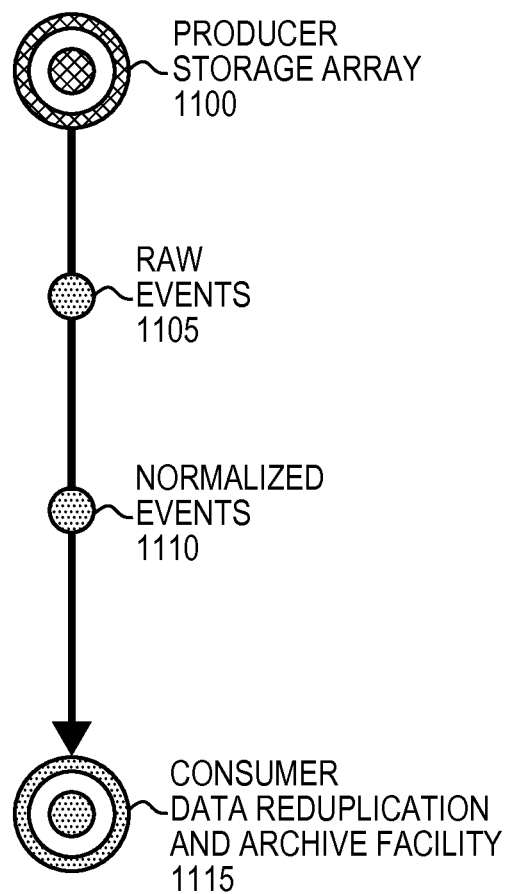
FIG. 11 is a simplified illustration of a producer publishing events, which are consumed by a consumer, in accordance with an embodiment of the present disclosure.

Refer now to the example embodiment of FIG. 11 which illustrates a sample interaction between a producer of events and a consumer of events. Primary Storage (such as a VNX NAS) 1100, a storage system, generates file change events and publishes raw events 1105 to a message bus thru CEP (analytic module). Raw events 1105 may be normalized 1110 by the message bus which publishes the normalized events. The normalized events 1110 may be consumed by Data Reduplication & Archive Facility (such as a Data Domain) 1115, which picks up the file change list at a specified time, extract file content, de-dupes and archives in the Data Reduplication & Archive Facility (such as a Data Domain) back up vault.

Figure 12:
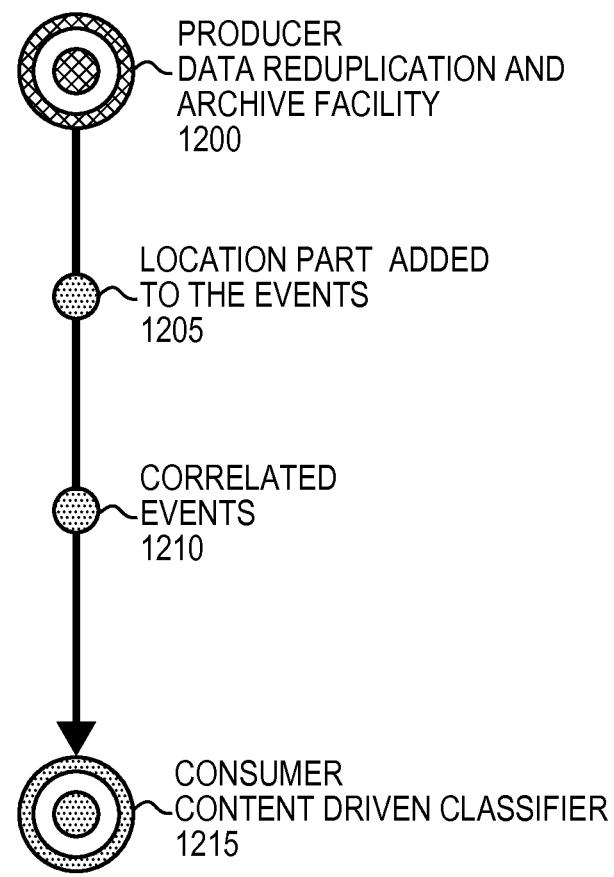
FIG. 12 is an alternative simplified illustration of a producer publishing events, which are consumed by a consumer, in accordance with an embodiment of the present disclosure.

Refer now to the example embodiment of FIG. 12, which illustrates a further example of a producer and a consumer. Data Reduplication & Archive Facility (such as a Data Domain) 1200 produces and publishes a URI (Universal Resource Identifier) for de-dupe content 1205 adding a part to the original event message. The message bus normalizes the event published to the correlated topics 1210. A consumer, Content Driven Classifier (such as Kazeon) 1215, reads the correlated events 1210, grabs the changed file from the secondary location for crawling.

Figure 13:
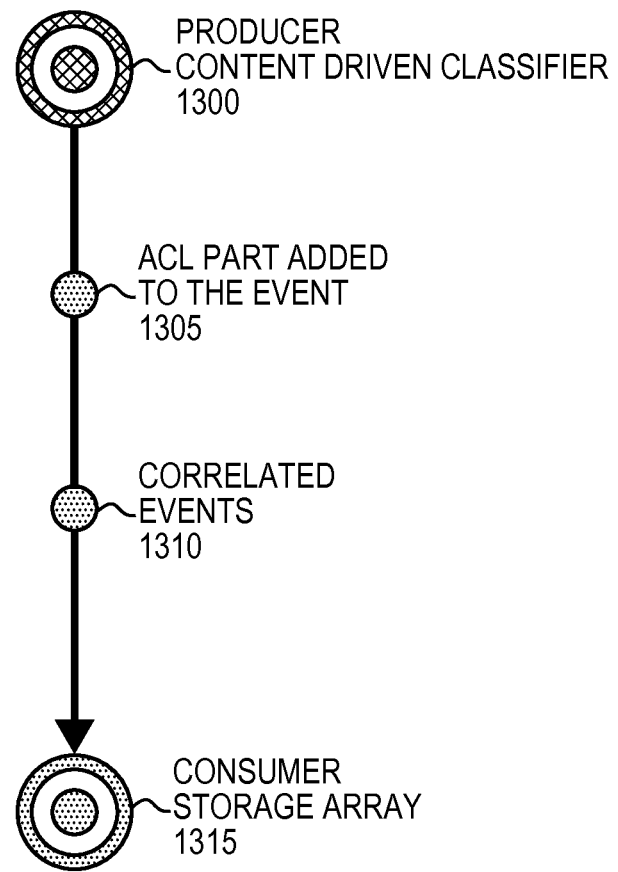
FIG. 13 is a further simplified illustration of a producer publishing events, which are consumed by a consumer, in accordance with an embodiment of the present disclosure.

Refer now to the example embodiment of FIG. 13, which illustrates a further example of a producer and a consumer. Producer Content Driven Classifier (such as Kazeon) 1300 provides a detection of policy changes with the legal hold generates an event 1305. The event is normalized, correlated and published in the topic Consumer 1310. Primary Storage (such as a VNX NAS) 1315 monitoring the topic picks up the event and reconfigures the SLA for file.

Figure 14:
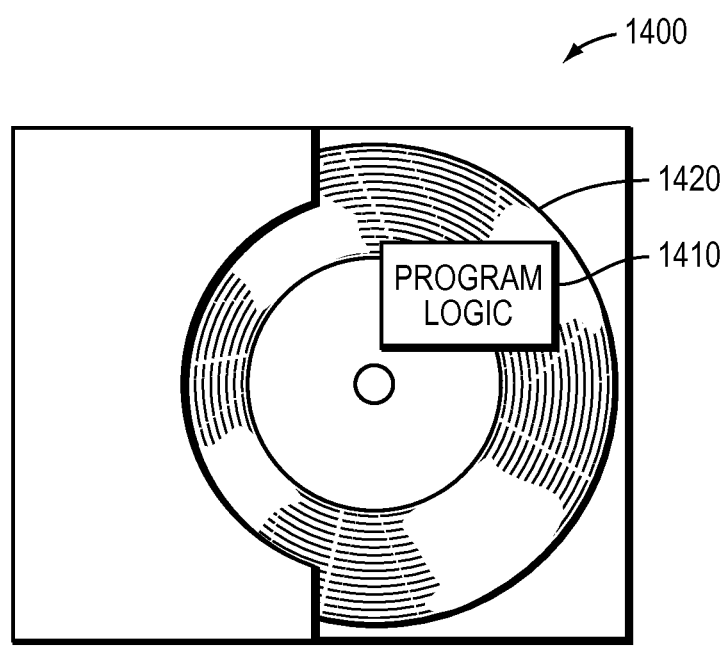
FIG. 14 is an example of an embodiment of an apparatus that may utilize the techniques described herein, in accordance with an embodiment of the present disclosure.
Figure 15:
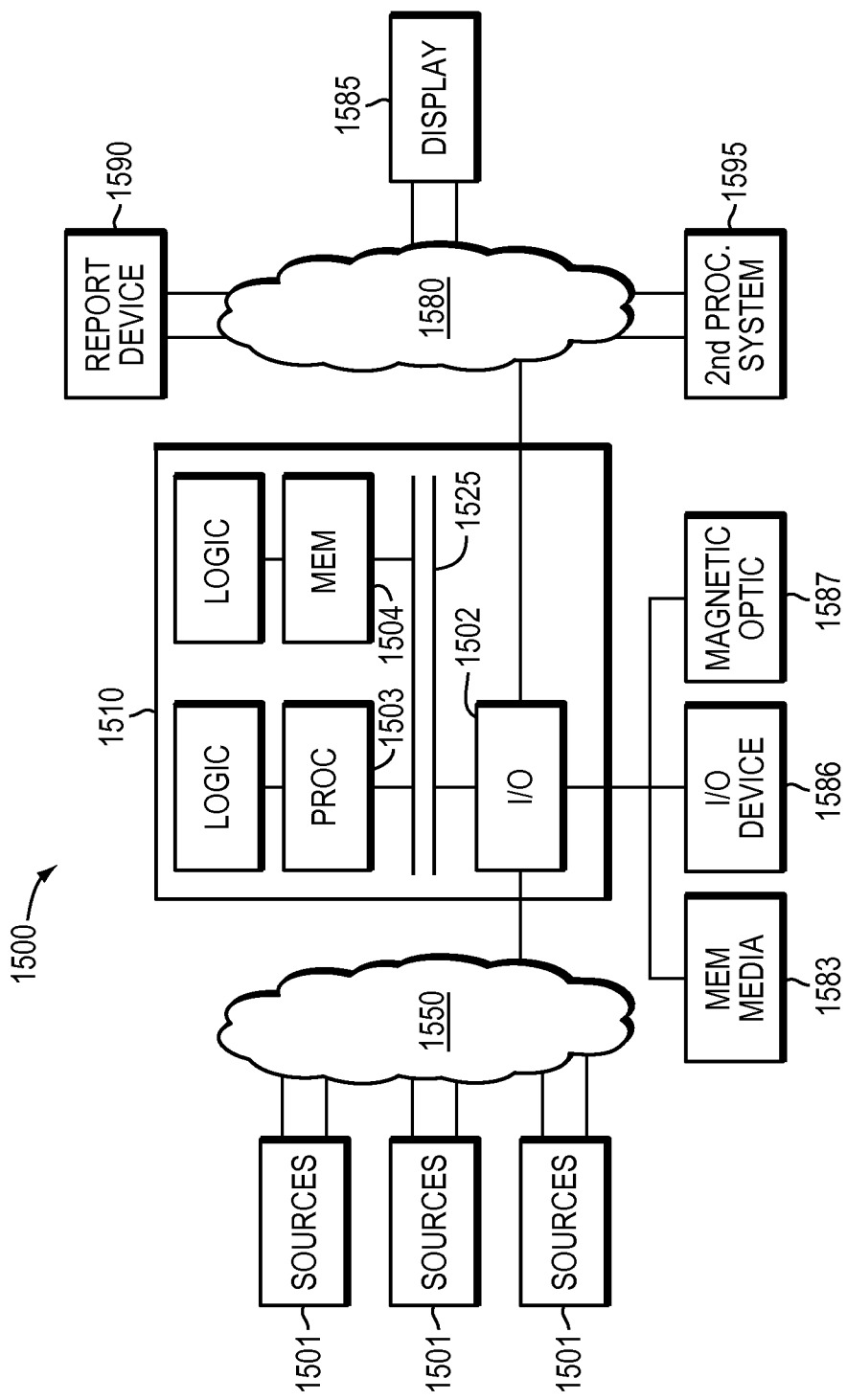
FIG. 15 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor 1403 to provide a unique apparatus that operates analogously to specific logic circuits. As such a general purpose digital machine can be transformed into a special purpose digital machine. FIG. 15 shows Program Logic 1534 embodied on a computer-readable medium 1530 as shown, and wherein the Logic is encoded in computer-executable code configured for carrying out the reservation service process of this invention and thereby forming a Computer Program Product 1500. The logic 1534 may be the same logic 1440 on memory 1404 loaded on processor 1403. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIG. 4 and FIG. 5. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A system comprising:
   a storage array;
   an IO path;
   an interceptor communicatively coupled to the IO path;
   a message bus; and
      computer-executable logic operating in memory, wherein the computer-executable program logic is configured to enable one or more processors to execute:
   intercepting, by the interceptor, IO sent on the IO path to the storage array;
   sending a copy of the IO and metadata to the message bus; and
   enabling a consumer of a set of consumers to register with the message bus to consume events sent to the message bus, wherein at least one consumer of the set of consumers is enabled to process one or more events from the message bus; wherein the processing transforms the one or more events; and wherein the at least one consumer of the set of consumers is enabled to publish a processed event to a message queue on the message bus based on the one or more events.

2. The system of claim 1 wherein content change metadata is sent to the message queue, and wherein computer executable logic is further configured to enable execution of:
  enabling producers to register with the message bus and publish IO to the message bus.

3. The system of claim 2 wherein the IOs intercepted are classified as storage events on the message queue; and wherein computer executable logic is further configured to enable execution of:
  indexing changed documents based on the changes consumed from the message bus;
  applying a policy to the index changed documents;
  generating policy compliance events based on whether the policy allowed the change documents to be changed.

4. The system of claim 2 wherein the IOs intercepted are classified as storage events on the message queue; and wherein computer executable logic is further configured to enable execution of:
  receiving the storage events at a policy verifier; wherein the policy verifier consumes the storage events from the message bus;
  validating a storage policy against the storage events; and
  posting a policy exception event to the message queue when the storage event violates the storage policy.

5. The system of claim 1 wherein IO is sent to the message queue, and wherein computer executable logic is further configured to enable execution of:
  consuming IO at an event correlator;
  correlating IO at the event correlator; and
  publishing the correlated IO to the message bus.

6. The system of claim 5 wherein the intercepting intercepts IO sent from a client to the storage array via the interceptor; and wherein the computer executable logic is further configured to enable execution of:
  enabling the storage array to subscribe to the message bus to consume the correlated IO.

7. The system of claim 1 the message queue comprises an active queue, an archive queue and a front end-queue.

8. The system of claim 1 wherein a consumer of a set of consumers enabled to consume events sent to the message bus, and wherein computer executable logic is further configured to enable execution of:
  consuming events from the message bus by an event content driven classifier.

9. A computer implemented method comprising:
  intercepting, by an interceptor, IO sent on an IO path to a storage array;
  sending a copy of the IO and metadata to a message bus; and
  enabling a consumer of a set of consumers to register with the message bus to consume events sent to the message bus, wherein at least one consumer of the set of consumers is enabled to process the event; wherein the process transforms the event; and wherein the at least one consumer of the set of consumers is enabled to publish the event to a message queue on the message bus.

10. The method of claim 9 wherein content change metadata is sent to the message queue, and wherein the method further comprises:
  enabling producers to register with the message bus and publish IO to the message bus.

11. The method of claim 10 wherein the IOs intercepted are classified as storage events on the message queue; and wherein the method further comprises:
  consuming events from the message bus by an event content driven classifier;
  indexing changed documents based on the changes consumed from the message bus;
  applying a policy to the index changed documents;
  generating policy compliance events based on whether the policy allowed the change documents to be changed.

12. The method of claim 9 wherein IO is sent to the message queue, wherein the intercepting intercepts IO sent from a client to the storage array via the interceptor; and wherein the method further comprises:
  consuming IO at an event correlator;
  correlating IO at the event correlator;
  publishing the correlated IO to the message bus; and
  enabling the storage array to subscribe to the message bus to consume the correlated IO.

13. The method of claim 9 wherein the IOs intercepted are classified as storage events on the message queue; and wherein the method further comprises:
  receiving the storage events at a policy verifier; wherein the policy verifier consumes the storage events from the message bus;
  validating a storage policy against the storage events; and
  posting a policy exception event to the message queue when the storage event violates the storage policy.

14. The method of claim 9 wherein the message queue comprises an active queue, an archive queue and a front end-queue.

15. A computer implemented method comprising:
  a non-transitory computer readable medium encoded with computer executable program code for replication of data, the code configured to enable the execution of:
  intercepting, by an interceptor, IO sent on an IO path to a storage array;
  sending a copy of the IO and metadata to a message bus; and
  enabling a consumer of a set of consumers to register with the message bus to consume events sent to the message bus, wherein at least one consumer of the set of consumers is enabled to process the event; wherein the process transforms the event; and wherein the at least one consumer of the set of consumers is enabled to publish the event to a message queue on the message bus.

16. The method of claim 15 wherein content change metadata is sent to the message queue, and further comprising:
  enabling producers to register with the message bus and publish IO to the message bus.

17. The method of claim 15, wherein IO is sent to the message queue, wherein the intercepting intercepts IO sent from a client to the storage array via the interceptor; and further comprising:
  consuming IO at an event correlator;
  correlating IO at the event correlator;
  publishing the correlated IO to the message bus; and
  enabling the storage array to subscribe to the message bus to consume the correlated IO.

18. The method claim 17 wherein the IOs intercepted are classified as storage events on the message queue; and further comprising:
  consuming events from the message bus by an event content driven classifier;
  indexing changed documents based on the changes consumed from the message bus;
  applying a policy to the index changed documents;
  generating policy compliance events based on whether the policy allowed the change documents to be changed.

19. The method of claim 17 wherein the IOs intercepted are classified as storage events on the message queue; and further comprising:

receiving the storage events at a policy verifier; wherein the policy verifier consumes the storage events from the message bus;

validating a storage policy against the storage events; and posting a policy exception event to the message queue when the storage event violates the storage policy.

20. The method of claim 15 the message queue comprises an active queue, an archive queue and a front end-queue.

* * * * *